United States Patent [19]

Kakabaker

[11] Patent Number: 4,630,458

[45] Date of Patent: Dec. 23, 1986

[54] SEAL ARRANGEMENT FOR MILL ROLL

[75] Inventor: Kenneth G. Kakabaker, Kalamazoo, Mich.

[73] Assignee: Durametallic Corporation, Kalamazoo, Mich.

[21] Appl. No.: 710,822

[22] Filed: Mar. 12, 1985

[51] Int. Cl.⁴ .................... B21B 27/10; B21B 31/07
[52] U.S. Cl. .................................. 72/237; 72/201; 72/236; 277/56; 384/480
[58] Field of Search ............... 72/237, 236, 201; 277/24, 53, 55, 56; 384/144, 152, 480

[56] References Cited

U.S. PATENT DOCUMENTS

| | | | |
|---|---|---|---|
| 1,890,839 | 12/1932 | Young . | |
| 1,991,077 | 2/1935 | Brittain, Jr. | 277/56 X |
| 2,274,201 | 2/1942 | Horger | 277/53 |
| 2,281,905 | 5/1942 | Young | 277/71 X |
| 2,740,647 | 4/1956 | Van Pelt | 277/56 X |
| 4,022,479 | 5/1977 | Orlowski | 277/53 |
| 4,114,902 | 9/1978 | Orlowski | 277/53 |
| 4,422,698 | 12/1983 | Aoki et al. | 384/482 |
| 4,455,856 | 6/1984 | Salter, Jr. et al. | 72/236 |
| 4,484,754 | 11/1984 | Ballard | 277/24 X |

FOREIGN PATENT DOCUMENTS

| | | | |
|---|---|---|---|
| 0479388 | 7/1929 | Fed. Rep. of Germany | 277/56 |
| 509935 | 7/1939 | United Kingdom . | |
| 1308098 | 2/1973 | United Kingdom | 277/56 |

OTHER PUBLICATIONS

"Selection of Backup Roll Bearings for Nonferrous Strip Mills", D. Hobson, *Journal of the American Society of Lubrication Engineers,* Apr. 1983, vol. 40, 5, pp. 277–284.

"Elimination of Bearing Housing Contamination in General-Purpose API Centrifugal Pumps", Barnard and Sowrey, *Journal of ASLE,* vol. 40, 5, 285–289.

*Product Engineering Design Manual,* edited by Douglas C. Greenwood, McGraw Hill, 1959, pp. 306–313.

*Primary Examiner*—Francis S. Husar
*Assistant Examiner*—Steve Katz
*Attorney, Agent, or Firm*—Flynn, Thiel, Boutell & Tanis

[57] ABSTRACT

A bearing isolator assembly particularly for use in a roll mill for isolating the environment from the support shaft bearing. A first isolator ring is non-rotatably mounted on the shaft and is concentric with and rotatable relative to a pair of fixed isolator rings which concentrically surround the shaft and are fixed to a support housing. These isolator rings defines therebetween a narrow clearance space which defines a tortuous path which initially includes a U-shaped labyrinth, one end of which communicates with the environment, and the other end of which communicates with an enlarged annular collection chamber which has a drain port associated therewith. This collection chamber is behind a dam associated with the rotatable isolator ring, and the downstream side of the dam is positioned closely adjacent a radial wall on the fixed isolator ring to define a narrow passage therebetween. This narrow passage, and the rotation of the dam, exerts sufficient centrifugal force to prevent the fluid from flowing radially inwardly so that the fluid is returned to the collection chamber.

7 Claims, 5 Drawing Figures

SEAL ARRANGEMENT FOR MILL ROLL

FIELD OF THE INVENTION

This invention relates to an arrangement for sealing the bearing of a mill roll and, more specifically, to a bearing assembly which will provide increased protection for the bearings of large-diameter mill rolls.

BACKGROUND OF THE INVENTION

Most roll mills as utilized in the steel and aluminum industries employ an opposed pair of largediameter steel rollers which create a nip therebetween through which metal stock is fed so as to reduce its thickness, such as for forming plate or the like. The ends of these rolls have integral hubs of reduced diameter projecting outwardly therefrom, which hubs are supported in stands through antifriction or sleeve bearing assemblies. The metal stock which is fed between the rolls, whether it be aluminum or steel, is conventionally hot so as to effect rolling of the metal, and this high temperature of the metal coupled with the slag in the metal can cause excessive spauling of the roll surfaces. To increase the life of the roll surfaces, it is conventional to provide nozzles directly upstream of the nip so as to jet streams of cool water onto the hot metal. Such water effectively floods the metal and the nip area, and necessarily picks up substantial contaminates such as slag and the like. This coolant, however, also floods the areas surrounding the hub bearings. In an attempt to avoid contamination of the bearings, the bearings are conventionally provided with a seal arrangement such as a multiple lip seal disposed for sealing cooperation with the hub neck.

While assemblies of the above type using lip seal arrangements for sealing the hub neck have been utilized for many years, and in fact are still being utilized, nevertheless these lip seal arrangements have been unsatisfactory. For example, experience in this industry indicates that the lip seals create wear on the hubs and also rapidly break down so that the contaminate-containing coolant hence gains access to the bearings. The lubricant in the bearings hence rapidly deteriorates so that bearing seizure is a fairly common occurrence. In fact, it has been observed that bearing seizure sometimes occurs after a mill roll has been in use only a small number of hours. When bearing seizure occurs, it is necessary to shut down and disassemble the mill, and this is a costly endeavor. Removing the seized bearing from the hub of the mill roll is also difficult, and in many instances this results in breakage of the hub, or in the alternative the hub sometimes breaks at the time the bearing seizes. When this happens, the complete mill roll must be totally reworked as by being melted down and reformed. This is obviously expensive and time consuming as such mill rolls may cost as much as $50,000.00 each and a typical mill may have 12 sets of rolls each requiring four seals. In view of the magnitude of this problem, numerous types of seal assemblies have been utilized in an attempt to resolve the problem of contaminated coolant gaining access to the bearings, but most such attempts (involving various combinations of lip seals) have proven unsatisfactory in that they have not significantly increased the number of hours of operation prior to bearing failure.

Accordingly, this invention relates to an improved sealing arrangement designed specifically for protecting bearings of a mill roll, which sealing arrangement is believed to represent a significant departure from conventional sealing arrangements used for this purpose, and hence is believed to represent a significant improvement by permitting the mill to operate for significantly longer periods of time prior to experiencing bearing failure.

In the improved arrangement of this invention, there is provided an isolator assembly for cooperating between the hub neck and the support stand to isolate the bearing from the contaminated coolant. This isolator assembly includes a rotatable isolator ring (i.e. a rotor) which is nonrotatably coupled to the hub and is concentrically disposed between inner and outer non-rotatable isolator rings (i.e. stators). These isolator rings cooperate to define a clearance space therebetween which involves numerous close clearances including reversely oriented axial passages, and an enlarged annular collection chamber to permit trapping of the contaminated coolant due to centrifugal force, and removal of the coolant therefrom by centrifugal force prior to its reaching the bearing.

In the improvement of the invention, as foresaid, the arrangement of the isolator rotor with respect to the isolator stators is such as to reduce the energy of fluid flowing into the isolator so that gravity and centrifugal forces will trap the liquid and not allow it to flow into the bearing housing sump. To achieve this task, four features are provided, namely (1) a restriction of inward flow to reduce energy, (2) a change in fluid flow direction, (3) a radially outward pumping dam, and (4) a chamber to trap, dissipate energy and drain fluid contaminate to the atmosphere.

Other structural and operational advantages of the arrangement of this invention will be apparent after reading the following specification and inspecting the accompanying drawings.

Figure 1:
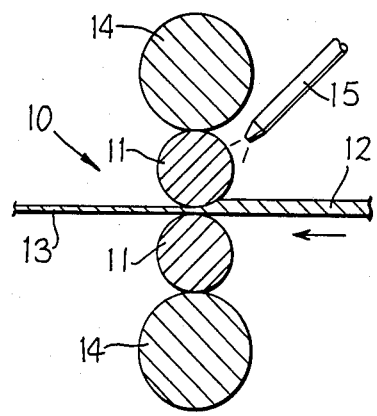
FIG. 1 is an elevational view, in cross-section, diagrammatically illustrating a typical roller mill arrangement.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from the geometric center of the assembly and designated parts thereof. Said terminology will include the words specifically mentioned, derivatives thereof, and words of similar input.

DETAILED DESCRIPTION

Referring to FIG. 1, there is diagrammatically illustrated a conventional rolling mill 10, such as utilized for rolling steel, aluminum and the like. However, such mills are also used for paper, processing ores and minerals, and conveyor lines for spray coating of paint or solvents or pickling operations as substantially being used in conveying or rolling operations involving liquid coating or spraying.

The mill 10 includes a pair of opposed rolls 11 disposed directly one above the other and defining a narrow nip therebetween to which is fed the metal stock 12, such as a hot steel bar which is to be thinned. This bar is driven through the nip of the rotating rolls 11 so as to exit in thinner form as indicated at 13. The main rolls 11 are conventionally backed by heavier pressure rolls 14 which contact the main rolls 11 at locations diametrically opposite the nip. The main rolls 11 are generally solid steel rolls having a diameter conventionally in the range of about 12 to 30 inches, and the pressure rolls 14 are of even larger diameter. Since the high temperature of the stock 12 supplied to the nip can seriously deteriorate the rolls 11, such as by causing surface spalling, it is conventional to flood the hot stock and the nip of the roll 11 with coolant. For example, one or more nozzles 15 are normally positioned above the top roll so as to discharge large quantities of coolant, such as water, over the stock and the rolls. This flooding of the system with coolant results in the coolant becoming contaminated, and large quantities of this contaminated coolant flow over the bearing supports for the rolls.

Figure 2:
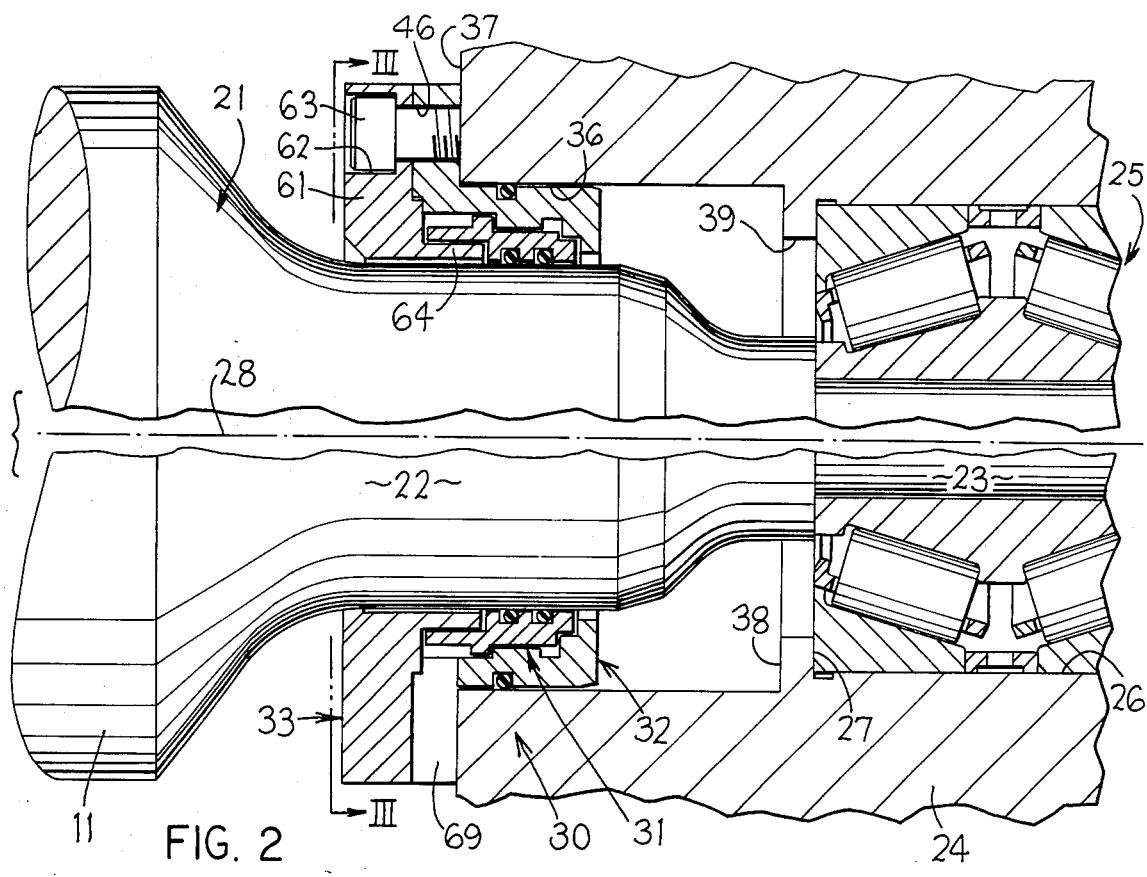
FIG. 2 is a fragmentary sectional view illustrating the arrangement of an anti-friction bearing and an isolator assembly cooperating with a roll hub, this view being taken substantially along line II—II in FIG. 3.
Figure 3:
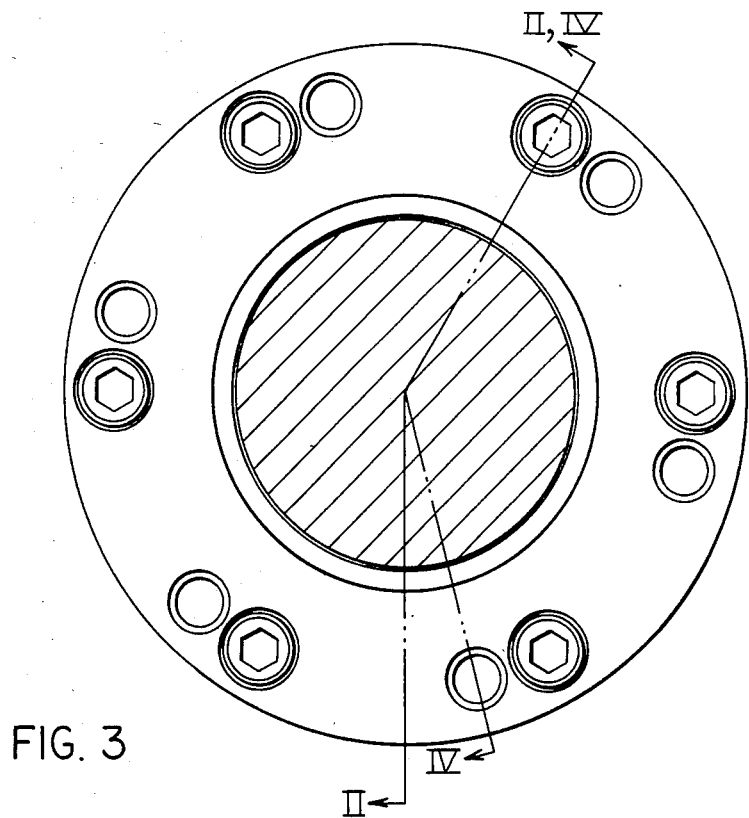
FIG. 3 is an end view as taken substantially along line III—III in FIG. 2.

FIG. 2 illustrates the improved bearing support of this present invention as applied to the main roll 11. The main roll 11 has a stepped and integral hub 21 projecting coaxially outwardly from each end thereof, which hub includes an inner hub or neck portion 22 which is of reduced diameter from the main roll. This inner hub, which is typically in the order of 17 to 20 inches in diameter, coaxially joins to an outer hub 23 which is of reduced diameter relative to the inner hub. The stepped hub 21 is supported on a stationary support stand or frame 24, the latter having a bore 26 therein which accommodates a conventional anti-friction bearing assembly 25, the latter being mounted on the outer hub 23 so as to rotatably support the main roll 11. The inner race of bearing assembly 25 abuts against a shoulder 27 formed at the inner end of the outer hub 23. The anti-friction bearing 25 supports the roll 11 for rotation about its longitudinal axis 28.

The inner hub or neck portion 22 of the main roll has a sealing assembly 30 disposed in surrounding relationship therewith and cooperating with the stand 24 so as to prevent contaminated coolant from contacting the bearing assembly 25. While this sealing assembly 30 conventionally employs a plurality of elastomeric lip seals disposed in series, the sealing assembly 30 of this invention constitutes an isolator assembly formed by isolator rings 31, 32 and 33. The inner and outer rings 31 and 32 concentrically surround one another and are respectively nonrotatably coupled to the hub 22 and stand 24. The mounting ring 33 also surrounds the hub 22 and fixedly mounts to the end of the stand 24. The rings 31, 32, 33 are all preferably constructed of bronze, but other materials such as aluminum may also be suitable.

This bearing isolator assembly 30 defines a narrow clearance space which defines an elongate tortuous path between the bearing assembly and the contaminated exterior of the stand, which tortuous path contains segments of extremely close clearance between opposed surfaces which effectively act as dams or restrictions for minimizing or preventing flow therebetween. The path additionally has a collection chamber intermediate the length thereof to facilitate the accumulation and discharge of contaminants. This hence effectively prevents flow of coolant and contaminants into the bearing assembly, while at the same time providing for the necessary relative rotation to permit operation of the bearings in a highly contaminated external environment for long periods of time so as to permit increased running intervals for the mill. This tortuous path will be more clearly understood and explained in light of the detailed description of the bearing isolator as set forth hereinafter.

The bearing isolator assembly 30, as illustrated in FIG. 2, projects into a substantially cylindrical bore 36 which extends inwardly from the end surface 37 of the stand 24 in surrounding relationship to the roller hub 22. Bore 36 terminates at a radial end wall 38, the latter at its radially inner diameter joining to one end of a further bore 39 which extends coaxially between the bores 36 and 26 for accommodating the reducing neck portion between the hubs 22 and 23.

Figure 4:
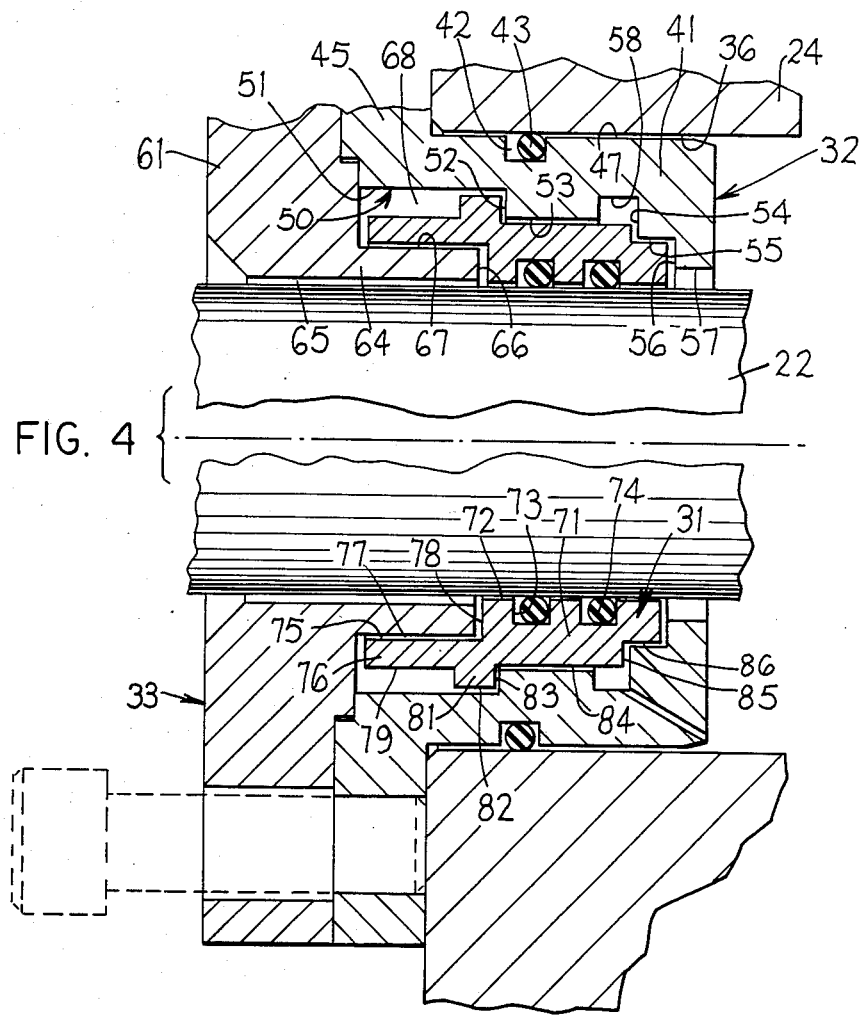
FIG. 4 is an enlarged fragmentary sectional view of the bearing isolator as taken from FIG. 2.

Considering first the outer isolator ring 32, and referring specifically to FIG. 4, this ring 32 includes an annular sleevelike hub 41 which is of substantial axial extent and projects into the bore 36. Hub 41 is defined by an outer cylindrical surface 47 which is spaced closely adjacent the wall of bore 36, and an annular groove 42 is formed in the hub and projects radially inwardly from the surface 47. This groove 42 is disposed intermediate the ends of the hub and accommodates a conventional elastomeric sealing ring 43, preferably an O-ring. This O-ring compressingly engages the wall of bore 36 to create a seal.

Outer isolator ring 32 also includes an annular flange 45 which is integrally fixed to and projects radially outwardly from the outer end of hub 41. This flange 45 radially overlaps the end surface 37 of the stand 24. A plurality of circumferentially spaced holes 46 (FIG. 2) extend through the flange 45 so as to accommodate fasteners therein.

A stepped bore 50 projects coaxially through the isolator ring 32, which stepped bore includes an outer bore 51 of largest diameter opening inwardly from the flanged-end of the ring 32. This cylindrical bore 51 extends over a substantial axial extent, and terminates at an annular bottom wall 52 which projects radially inwardly. The stepped bore includes an intermediate bore 53 of lesser diameter than the bore 51. This intermediate bore 53 extends coaxially from the wall 52 through a substantial axial extent until terminating at a further end wall or shoulder 54. This latter wall in turn projects radially inwardly, and a further inner bore 55 of still smaller diameter projects coaxially beyond this radial wall 54. The bores 51 and 53 are both of substantial and similar axial extent, whereas the bore 55 is of much shorter axial extent. Bore 55 terminates at bottom wall 56, and a still further bore 57 of yet smaller diameter projects through to the other axial end of the ring 32. This bore 57 is substantially aligned with the end of bore 39.

The hub 41 also has an enlarged annular groove 58 which surrounds and projects radially outwardly from the intermediate bore 53, which groove has one wall thereof defined by and projecting radially outwardly of the wall 54.

To positively and nonrotatably secure the outer isolator ring 32 to the stand 24, the mounting ring 33 includes an annular flange 61 which radially overlaps the annular flange 45 of the ring 32. Flange 61 has a plurality of shouldered holes 62 formed therethrough in annularly spaced relationship. These holes 62 align with the holes 46, and appropriate fasteners such as screws 63 extend therethrough and threadably engage into the stand 24.

The mounting ring 33 includes an annular sleeve-like hub 64 which is integrally and concentrically joined to the flange 61 but which projects axially beyond the flange so as to at least partially penetrate into the bore 36 formed in the stand 24. This hub 64 has an inner bore 65 extending coaxially therethrough, which bore defines an annular surface which is positioned closely adjacent but slightly spaced from the exterior surface of hub 22 so as to permit free relative rotation therebetween. The bore surface 65 preferably has a small diametral clearance relative to the hub 22 so as to provide a restrictive clearance space therebetween. The hub 64 is of substantial axial extent to hence create a clearance space which itself is of substantial axial extent so as to act as a restrictor.

The annular hub 64 terminates in an annular end surface 66, whereby the hub 64 projects into the outer bore 51 over a majority of the axial extent thereof. Hub 64 has an outer annular surface 67 of a diameter which is substantially smaller than the diameter of bore 51 so as to define an annular space 68 therebetween of substantial radial and axial extent. This space 68 in turn communicates with a port or opening 69 (FIG. 2), often referred to as a drain, which opening projects radially outwardly from the space 69 through the outer periphery of the flange 45. This opening 69 is positioned at the bottom of the flange so as to permit discharge of coolant and contaminates from the space 68 by gravity and centrifugal force.

Referring now to the inner isolator ring 31, same is of an axially elongated sleevelike construction and includes a main annular portion 71 having a bore 72 extending coaxially thereof, which bore 72 defines an inner annular surface having a diameter which only slightly exceeds the exterior diameter of hub 22. A plurality, hereto two, of axially-spaced annular grooves 73 surround and project radially outwardly from this inner annular wall 72. Each of these grooves contains therein an elastomeric sealing ring 74, preferably an O-ring, which is elastically compressed to create a sealed relationship between the hub 22 and the isolator ring 31. These compressed O-rings 74 also effectively maintain the isolator ring 31 in nonrotatable relationship with respect to the hub 22.

Isolator ring 31 has an annular nose 76 which projects coaxially from the main portion 71 toward the mounting ring 33. This annular nose 76 defines therein an annular bore 75 which projects coaxially of the ring 31 through a substantial axial extent and concentrically and coaxially communicates with the bore 72, these two bores being joined together by an annular radially extending end wall 78. The bore 75 defines an inner cylindrical wall 77 which closely and substantially concentrically surrounds the exterior annular surface 67 on the mounting ring hub 64, these surfaces 67 and 77 defining a narrow annular clearance space therebetween so as to not interfere with relative rotation between the parts. This narrow clearance space is also of substantial axial extent.

The axial nose 76 defines thereon an outer cylindrical wall 79, the latter being of significantly smaller diameter than the bore 51 so that a substantial portion of the annular space 68 remains therebetween, which space effectively acts as a collection chamber.

An annular flange 81 of short axial extent is integrally and fixedly secured to and projects radially outwardly from the nose 76 in surrounding relationship thereto, which flange 81 is disposed adjacent the axially inner end of the nose 76. The flange 81 has an outer annular surface 82 thereon which is disposed substantially concentric with and fairly close to the surrounding wall of bore 51, but there is defined therebetween a narrow annular clearance passage of rather short axial extent. Flange 81 also defines thereon a radially inwardly directed annular wall 83 on the rearward side thereof, which radial wall 83 is disposed closely adjacent but spaced a very small axial distance from the wall 52 on the ring 32, thereby defining a very narrow constriction passage which projects radially inwardly between these opposed walls.

The main annular portion 71 of ring 31 has an outer cylindrical wall 84 of a diameter similar to that of the flange wall 79. This wall 84 extends axially a substantial extent beyond the flange 81 so as to be positioned substantially concentric with and closely adjacent the wall of intermediate bore 53. These walls 53 and 84 defining therebetween a annular clearance passage of narrow radial but substantial axial extent. The outer cylindrical wall 84 projects axially a sufficient distance so as to overlap the annular groove 56. This outer surface 84, at the inner end of annular portion 71, is provided with an undercut groove which results in the formation of a radially-inwardly directed end surface 85 which axially opposes the wall 54 and is spaced therefrom. Radial wall 85 extends inwardly and joins to the inner end of a cylindrical wall 86 which is of smaller diameter than the wall 84. This wall 86 projects axially to the free end of the ring 31 so that this inner end portion projects into the inner bore 55, with the walls 86 and 55 again being substantially concentrically arranged in closely adjacent but slightly radially spaced relationship to define an annular clearance space of narrow radial width therebetween. The end wall of the ring 31 is positioned opposite the wall 56 and defines a further radial passage therebetween, the latter communicates with the bores 57 and 39.

The rotatable isolator ring 31 and its association with the stationary isolator structure (as defined by rings 32 and 33) hence defines an elongated tortuous passage therebetween, which passage extends from the environment adjacent the front face of the mounting flange 61 to the intermediate bore 39 which communicates with the anti-friction bearing. This tortuous passage is of substantial length, involves numerous changes in direction so that any flow hence has to basically occur in reverse directions, requires flow against the rotational effect of centrifugal force, and includes centrifugal-force assisted drain of fluid from the passage. This arrangement is hence believed to create an effective restriction which greatly minimizes the possibility of coolant flowing through the passage so as to cause contamination of the anti-friction bearing.

OPERATION

The operation of the present invention, and specifically the operation of the isolator assembly, will now be explained in greater detail to insure a complete understanding thereof.

During normal operation of the mill, the mill roll 11 and its hub 22 rotates at the desired rate, carrying with it the inner isolator ring 31, whereupon the latter hence rotates relative to the rings 32 and 33.

Figure 5:
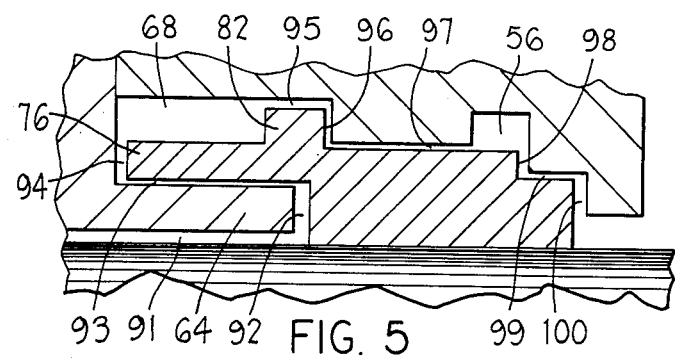
FIG. 5 diagrammatically illustrates the tortuous path through the isolator assembly.

Assuming that the surrounding environment is subjected to large quantities of coolant such as water, then some of this coolant will attempt to pass through the isolator assembly 30 so as to gain access to the bore 39 and hence the anti-friction bearing 25. The manner in which the coolant tends to pass through the isolator assembly is explained with reference to the diagrammatic illustration of the tortuous path through the isolator assembly, as appearing in FIG. 5.

The coolant will first have to pass along the hub 22 through the passage 91, which passage is of narrow radial extent (i.e. about 0.010 to about 0.020 inch) and is of substantial axial extent, so that this hence tends to keep a large quantity of fluid from passing through. At the inner end of passage 91, the fluid flows radially outwardly through the space 92, which space is radially short and of substantial axial width to purposely lessen the amount of fluid centrifuged into the interior of the isolator assembly. Space 92 joins with passage 93 which is also of similar narrow radial extent and of substantial axial extent. The length of these passages 91 and 93, coupled with the reversal of flow required by this interfitting ring geometry, hence greatly restricts the flow of fluid therethrough. Further, what fluid does succeed in passing through the passages 91 and 93 then flows through space 94 into the enlarged collection or drain space 68. Space 94 is also radially short to minimize the amount of fluid centrifuged into the interior of the isolator. The fluid and contaminants in the space 68, flow by gravity and by centrifugal force through the drain port 69 for external discharge.

However, assuming that some of the fluid is still able to flow around the flange or dam 82 through the restricted passage 95, then this fluid must then flow radially inwardly through the narrow passage 96 (which passage is about 0.015 to about 0.030 inch wide). However, the flange 82 rotates and hence tends to throw the fluid in passage 96 radially outwardly due to centrifugal force, whereupon the fluid is resupplied to chamber 68 for discharge through drain 69. This passage 96 and the dam effect created by flange 82, which dam effectively isolates the remainder of the chamber 68 from the passage 96, is highly effective in preventing fluid from flowing any further through the tortuous path. The passage 96, at its inner end, communicates with a narrow passage 97 which is also of substantial axial extent.

Passage 96 is radially much longer than either passage 94 or 92. And by the resulting centrifugal force, passage 96 is able to contain fluid attempting to escape to space 97.

It should be reiterated that the roll hub 22 is of large diameter, and hence the isolator rings themselves are of even larger diameter so that maintaining close tolerances both circumferentially and radially between relatively rotating parts is hence both difficult to achieve and maintain. For this reason, to the best of the inventors' knowledge, no one has previously attempted to utilize bearing isolators in association with a mill roll due to the extremely hostile environment and the extremely large diameters. Also, known isolator devices have lacked the combination of features incorporated into the present invention.

At the present time, most mill rolls use oil as a lubricant for the anti-friction bearing. Initial evaluation of the present invention indicates that the isolator assembly is highly effective in preventing flow of coolant and contaminates into the bearing assembly, and in fact it appears that the flow of fluid and contaminates progress no further than the dam 82 and pumping passage 96. This hence enables the user to use a flowable lubricant (i.e. oil) within a closed circuit for lubricating the anti-friction bearing, rather than grease, such being more desirable in that it is able to achieve more effective and uniform lubrication while maintaining a more uniform temperature, and hence enabling the mill roll to run at a higher rotational speed or providing extended bearing life. With such lubricant, however, there is a tendency for the lubricant to splash and escape from the bearing assembly. The isolator assembly of the present invention is also effective for confining this lubricant. Assuming that some of the lubricant leaves the bearing and flows axially outwardly through the intermediate bore 39, then this lubricant must flow through the zig-zag shaped labyrinth defined by the passages 98, 99, and 100. Any lubricant which succeeds in flowing through this labyrinth hence collects in the annular groove 56. This latter groove preferably has a drain connected thereto, which drain can be connected to the sump of the lubricant system if desired so as to permit recirculation of the lubricant. With this arrangement, the outer end of the isolator assembly is hence effective for preventing flow of coolant or external fluid through the assembly into the bearing assembly, and conversely the inner end of the isolator assembly is effective for maintaining the bearing lubricant within a closed system so as to prevent its escape to the surrounding environment.

While isolator rings 31–33 are each preferably of a one-piece construction, nevertheless some of these rings could possibly be horizontally split if necessary so as to adapt them for interfitting cooperation with one another.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mill roll assembly having a pair of large-diameter rotatable rolls disposed in parallel relation, the rolls being disposed adjacent one another to define a nip therebetween through which metal stock is fed, means for discharging coolant on the metal stock in the vicinity of said nip, each roll having support shafts of slightly reduced diameter projecting coaxially outwardly from opposite ends thereof, each said shaft projecting into an opening in a stationary stand, and bearing means disposed within said opening for rotatably supporting said shaft on said stand, the improvement comprising:

an isolator assembly coacting between said shaft and said stand adjacent the outer end of said opening for isolating said bearing means from the coolant, said isolator assembly including first, second and third isolator rings which substantially concentrically surround said shaft and are concentric with one another for cooperation between said shaft and said stand;

said first isolator ring being nonrotatably secured to said stand and having an annular sleevelike hub part which projects coaxially into said opening from the outer end thereof and is sealingly coupled with the wall of said opening;

said second isolator ring being nonrotatably fixed relative to said stand and cooperating with said first isolator ring to effectively close off the outer end of said opening, said second isolator ring including a sleeve part which closely surrounds said shaft to define a first radially narrow but axially elongated clearance space therebetween, said first clearance space at its axially outer end being in communication with the surrounding environment containing the coolant;

said sleeve part defining thereon an exterior annular surface of substantial axial extent which is concentrically surrounded by an interior annular surface of substantial axial extent as defined on said first isolator ring, said interior and exterior surfaces being radially spaced a substantial distance apart to define an annular clearance region therebetween of substantial radial and axial extent, said region at the outer axial end thereof being closed by the cooperation of said first and second isolator rings;

said third isolator ring being concentrically and nonrotatably mounted on said shaft within said opening and having a main hub portion directly adjacent the inner axial end of said sleeve part, said third ring having an annular flange part which projects axially outwardly from said main hub portion into said annular region, said flange part having an inner annular surface thereon which concentrically surrounds and is closely adjacent the exterior annular surface on said sleeve part to define a second annular clearance space therebetween of narrow radial but substantial axial extent, said second clearance space at the inner axial end thereof communicating with the axially inner end of the first clearance space through a radially directed clearance passage which extends between the opposed ends of said main hub portion and said sleeve part, said flange part having an exterior annular surface which is substantially concentric with but spaced a substantial distance from said interior annular surface as defined on said first ring to define therebetween an annular collection chamber of substantial axial and radial extent which communicates with the axially outer end of said second clearance space through a radial passage which extends across the free end of said flange part;

said third ring having an annular dam-like wall fixed to and projecting radially outwardly therefrom adjacent the inner axial end of said flange part, said dam-like wall having an outer annular surface which is positioned close to but spaced from the interior annular surface on said first ring;

said first ring having an annular flange portion which is fixed thereto and projects radially inwardly from said interior annular surface, said last mentioned flange portion being disposed axially inwardly of but closely axially adjacent said dam-like wall, said annular flange portion and said dam-like wall having closely adjacent and axially opposed surfaces which define therebetween a narrow passage which projects radially from a location disposed adjacent said inner annular surface to a location for communication with a third annular clearance space which is of small radial but substantial axial extent as formed between said flange portion and said main hub portion, said third clearance space at said inner axial end thereof being connected for communication with that portion of the opening containing the bearing means.

2. An assembly according to claim 1, wherein the first and third rings have concentrically surrounding and opposed inner ends defining an innerfitting stepped arrangement therebetween to create a narrow annular clearance therebetween which defines a zig-zag labyrinth for connecting the axially inner end of said third clearance space to that portion of the opening containing the bearing means, and said first ring having a radially enlarged annular groove formed therein for direct communication with and projecting radially outwardly from said third clearance space directly adjacent the axially inner end thereof, said last-mentioned groove functioning as a collection groove.

3. An assembly according to claim 1, wherein said first ring has a first annular flange at the axially outer end thereof which projects radially outwardly so as to overlap the end surface of said stand, said second ring at the axially outer end thereof having a second annular flange which projects radially outwardly so as to overlap said first flange, fasteners extending through said first and second flanges for fixedly securing the latter to said stand, said third ring being axially confined between said first and second rings, and a drainage port formed in and projecting radially through said first flange adjacent the lower side thereof, said port communicating with said collection chamber adjacent the lower part thereof for permitting gravity discharge of coolant therefrom.

4. An assembly according to claim 3, wherein the first and third rings have concentrically surrounding and opposed inner ends defining an innerfitting stepped arrangement therebetween to create a narrow annular clearance therebetween which defines a zig-zag labyrinth for connecting the axially inner end of said third clearance space to that portion of the opening containing the bearing means, and said first ring having a radially enlarged annular groove formed therein for direct communication with and projecting radially outwardly from said third clearance space directly adjacent the axially inner end thereof, said last-mentioned groove functioning as a collection groove.

5. In combination, a housing having a substantially horizontally oriented opening extending inwardly from an end face thereof, a rotatable stub shaft projecting coaxially into said opening, a bearing assembly disposed adjacent the inner end of said opening and rotatably supporting said stub shaft with respect to said housing, and an isolator assembly disposed adjacent the outer end of said opening and coacting between said stub shaft and said housing for isolating said bearing assembly from the external environment disposed adjacent the end face of the housing, the improvement comprising:

said isolator assembly including a first isolator ring substantially concentric with and nonrotatably mounted on said stub shaft, said first isolator ring being disposed within said opening but axially outwardly from said bearing assembly, said first isolator ring having a main sleeve part which closely surrounds and is sealingly engaged with said stub shaft;

said isolator assembly including a second isolator ring disposed concentric with said opening and fixed to said housing, said second isolator ring including a sleevelike hub coaxially disposed within and nonrotatably and sealingly coupled to said housing, said hub substantially concentrically surrounding the sleeve part of said first ring, said hub having a stepped bore formed coaxially therein in which is positioned said first ring, said stepped bore including a first bore extending coaxially inwardly from the outer end thereof and a second bore projecting coaxially inwardly from the inner end of said first bore, said first bore being of larger diameter than said second bore and a substantially radially-extending annular endwall extending between the adjacent ends of said first and second bores, said second ring having an interior annular wall as defined by said second bore which concentrically surrounds an exterior annular wall defined on said main sleeve part so as to define a first annular clearance space therebetween;

said isolator assembly including a third isolator ring which surrounds said stub shaft but is fixed to said housing in concentric relationship with said opening, said third ring including an annular flange which projects radially outwardly so as to overlap said end surface of said housing, and fasteners for securing said third ring to said housing, said second and third rings being fixedly joined together;

said third ring having a sleevelike portion which is fixed to said flange and projects axially therefrom toward the main sleeve part of said first ring, said sleevelike portion having an end surface thereon which is disposed adjacent but spaced from an opposed end surface formed on said main sleeve part, said sleevelike portion having an inner annular wall which closely and substantially concentrically surrounds said stub shaft to define a second annular clearance space therebetween which is of narrow radial but substantial axial extent, said second clearance space at the axially outer end thereof communicating with the surrounding environment and at the axial inner end thereof communicating with a radial clearance space between the sleevelike portion and sleeve part, said sleevelike portion being concentrically disposed within and having an outer annular surface which is of substantially smaller diameter than said first bore so as to define therebetween an annular chamber of substantial radial and axial extent, the axially outer end of said chamber being closed by the flange of said third ring;

said first ring having a sleevelike flange part which projects axially outwardly from said main sleeve part so as to project into said annular chamber, the free end of said flange part being spaced from the outer axial end wall of said chamber, said flange part having an inner annular wall which closely and concentrically surrounds the outer annular wall on the sleevelike portion to define a third annular clearance space of small radial but substantial axial extent, said flange part having an outer annular surface which is concentrically spaced inwardly a substantial radial extent from the wall of the first bore so as to define an annular collection chamber therebetween of substantial axial and radial extent;

one of said rings defining drain opening means communicating with the lower portion of said collection chamber for permitting external drainage of fluid therefrom; and said first ring having an annular damlike wall which projects radially outwardly and is disposed adjacent and defines the axially inner end of said collection chamber, said damlike wall having an outer peripheral wall which is spaced a slight distance from the wall of said first bore whereby said annular damlike wall projects radially outwardly a substantial extent beyond the diameter of said second bore, and the damlike wall having a radial wall on the inner axial side thereof which is disposed closely adjacent and directly opposite the radial end wall on said second ring, whereby these opposed and closely adjacent radial walls define a narrow clearance passage therebetween which at the radially inner edge thereof communicates with the outer axial end of said first clearance space.

6. A combination according to claim 5, wherein each of said first, second and third rings comprises a separate one-piece ring.

7. An assembly according to claim 1, wherein each of said first, second and third rings comprises a separate one-piece ring.

* * * * *